Aug. 6, 1963   C. R. MERKLE   3,099,980
FEED DISPENSER
Filed Nov. 30, 1961
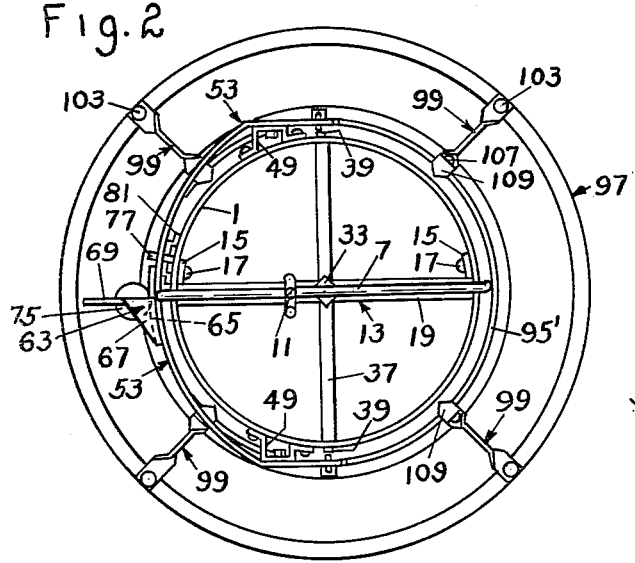
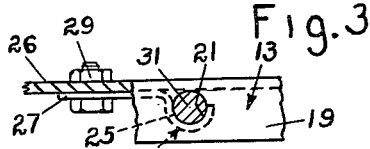
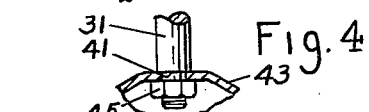
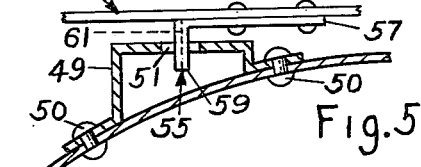
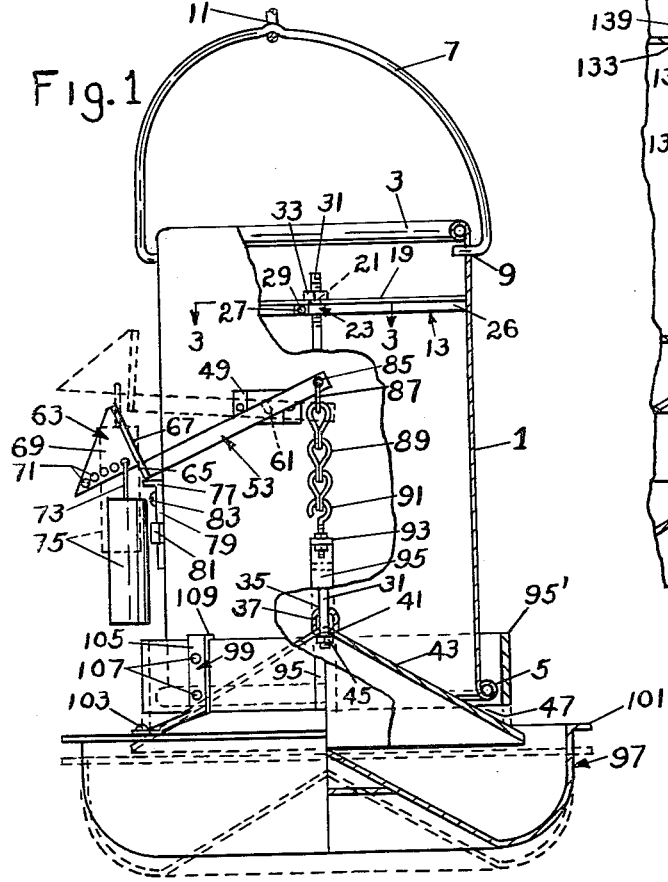
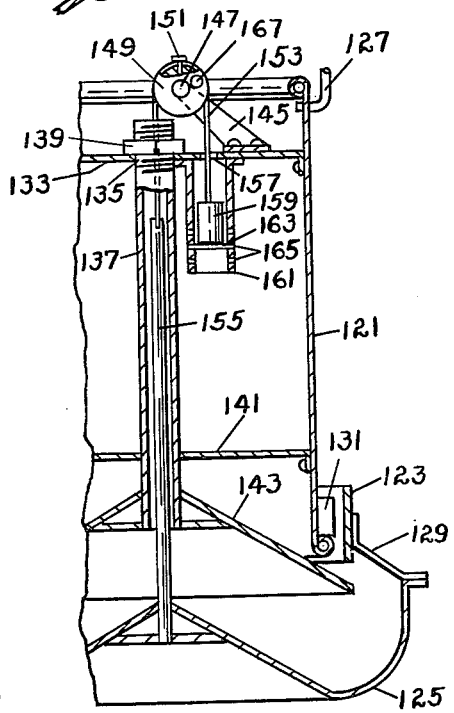
INVENTOR.
CHARLES ROBERT MERKLE
BY
Edmund W.E. Kamm
ATTORNEY United States Patent Office 3,099,980
Patented Aug. 6, 1963

3,099,980
FEED DISPENSER
Charles Robert Merkle, R.R. 2, Claypool, Ind.
Filed Nov. 30, 1961, Ser. No. 156,038
18 Claims. (Cl. 119—57)

This invention relates to a feed dispenser. More specifically it relates to a poultry feeder which will dispense various types of dry feeds such as mash, pellets, ground grains etc.

It is an object of the invention to provide a feeder which operates automatically to discharge a limited quantity of feed on each operation and thereafter to discharge an additional similar quantity only when the first quantity is substantially all consumed.

Another object of the invention is to provide means for adjusting the quantity of feed discharged on each operation.

A further object of the invention is to provide means for deterring the birds from actuating the feeder accidentally by roosting thereon.

Yet another object is to provide a mechanism which is simple and which will remain operable over a long period of time without adjustment or repair.

A further object is to provide means for adjusting the feeder to dispense different types and amounts of the feed.

It is another object to provide means for adjusting the size of the orifice through which feed is discharged.

Still another object is to provide adjustable means for varying the amount of gate opening.

A further objective is to provide an overcentering or overbalancing structure which, once either the control weight or the pan and feed start a movement of the weight, causes the movement to continue to completion and which delays the starting of movement in the opposite direction.

These and other objects will become apparent from a study of this specification and the drawings which are attached hereto and made a part hereof, in which FIGURE 1 is side elevation of the feeder with parts broken away to show certain details.

FIGURE 2 is a top plan view of the structure of FIGURE 1.

FIGURE 3 is an enlarged detailed view of the cone adjusting structure.

FIG. 4 is an enlarged detailed view of the cone fastening structure.

FIGURE 5 is an enlarged detailed view of the lever fulcrum structure.

FIGURE 6 is a view similar to FIGURE 1 showing a modified form of actuating mechanism.

Referring first to FIGURE 1, numeral 1 indicates the feed hopper or storage container which may be cylindrical or may be made with a slight upwardly converging taper. The upper end of the hopper is preferably rolled inwardly to form a bead 3 while the lower end is rolled outwardly to form bead 5. A bail 7 is pivotally mounted in diametrically opposed holes 9 in the upper end of the hopper. The bail is preferably asymmetrical so that the point at which it will be hung from a hook 11 or the like is disposed to one side of the vertical axis of the hopper. The purpose of this construction is to support the feed pan eccentrically to counterbalance the weight 75 described below, so that the feeder will hang vertically.

An angle brace 13 extends diametrically across the hopper at a level below the top end thereof and has an ear bent laterally at each end thereof which is fixed to the hopper by a rivet 17. The upper flange 19 of the brace is perforated at 2 and a semicylindrical grooved clamp 23 has its groove 25 aligned with hole 21 and has a tang or ear 27 fastened to the vertical flange 26 of the brace by a bolt 29. A support rod 31 is inserted through the hole 21 and groove 25 and depends from the brace. The ends of the rod are threaded and a nut 33 on the upper end rests on the brace and can be rotated to raise or lower the rod. The bolt 29 is then tightened to clamp rod 31 against the vertical brace flange. The lower end of the rod is passed through a hole 35 in a second brace 37 which extends diametrically across the hopper, preferably at right angles to the direction of brace 13. Brace 37 has an inverted U-shaped cross-section and has a tang 39 which extends through a slot in the hopper and is bent down to hold the brace in place.

The lower end of rod is of reduced diameter to form a shoulder 41. The rod has its small end passed through a hole formed at the apex of the feed distributing cone or distributer 43. A nut 45 clamps the cone firmly against the shoulder of the rod. The cone extends downwardly and outwardly beyond the bead 5 and thus defines with said bead an annular feed discharge orifice indicated generally by 47 which is adjustable by loosening clamp 23 and adjusting nut 33 as mentioned above.

A pair of generally U-shaped fulcrum brackets 49 are fastened to the exterior of the hopper on either side thereof by bolts 50. However, these brackets are not diametrically opposed but are set equidistantly from and on the same side of the diameter of the hopper, toward the weight 75, as shown in FIGURE 2. Each bracket is provided with a cylindrical opening at 51 and the openings are axially aligned. A U-shaped, first class lever 53 is disposed so that its free ends span the brackets. An L-shaped fulcrum piece 55 is provided for each arm of the lever. Each fulcrum piece has one leg 57 fastened to the inside of the associated arm by rivets and the other leg 59 extends at right angles thereto and enters the associated opening 51 of the bracket. The lower edge of leg 59 rests on the bracket at the bottom of the hole and is preferably sharpened to a knife edge indicated at 61. The lever is thus supported by the brackets for rocking thereon.

The lever 53 has an arm member 63 riveted thereto at the middle of its U portion. The arm is preferably made of sheet metal having a base portion 65 riveted to the lever, an upstanding first triagular portion 67 integral with and rising from the base portion for half the length thereof and having a second triagular arm portion 69 bent outwardly from the first portion so as to extend at right angles to it and to the bail. The triangular portion and arm present sloping upper edges so as to discourage the birds from perching on the mechanism.

A row of holes 71 is provided along the lower edge of arm 69 to receive the hook 73 of a weight 75.

A movable stop 77 projects outwardly from the hopper so as to underlie and limit the downward motion of the lever 53 in response to the weight. The shank 79 of the stop extends downwardly along the hopper through a guide 81 which is fixed to the hopper. A bolt 83 is inserted through a hole in the shank and through one of a number of holes in the hopper which are arranged in a vertical row so as to permit adjustable positioning of the stop at a higher or lower level. The holes are covered by the shank to prevent leakage of feed from the hopper.

As shown in FIGS. 1 and 2, the free ends of the lever 53 extend somewhat beyond the diameter of the hopper and each has a hole 85 formed above the center line of the lever in which is received a hook or link 87 which supports a depending chain or other flexible member 89. As seen in FIG. 1, the line joining the bottoms of any hole 71 and the bottom of hole 85 lies above the knife edge 61 so that the lever will not attain a state of equilibrium intermediate its two extreme positions as the beam of a scale does, but instead it is unstable so that when the load tending to tilt the arm away from one of its positions of rest becomes great enough to start the arm moving, it will continue to move to its other extreme position. It is this action which renders the mechanism positive and reliable in its operation. Also, once the lever has reached one of its positions, a considerable change of weight is required to start the lever moving the opposite direction.

The chains 89 each receive a hook 91 which is mounted on the bent out ear 93 of a strap 95, the lower end of which is fixed rigidly to a cylindrical gate 95'. The gate has an internal diameter which is somewhat larger than the external diameter of the hopper head 5 but which is less than the maximum diameter of the cone 43. A feed pan 97, having a greater diameter than the cone, is dependingly supported from the gate by means of four rigid struts 99 which have their outward ends fastened to the rim 101 of the pan by rivets 103. Their upward extending portions 105 are disposed in vertical contact with the gate and fixed thereto by rivets 107 and their upper ends 109 are bent inwardly toward but terminate in spaced relation to the hopper to serve as guides or stops. They engage the hopper to limit lateral displacement of the gate with respect to the hopper.

Operation

It should be noted that in the positions of the lever 53, gate 95' and pan 97 shown in solid lines (FIG. 1), the gate is lifted from the cone 43 so that feed can flow through the annular opening 47, into the pan. When the weight of the feed in the pan plus the weight of the pan, gate and other parts supported in the holes 85 of lever 53 over-balances the weight 75, the lever 53 starts to tilt about its fulcrum knife-edge 61 in a clockwise direction and continues in the same direction until the gate 95' comes into engagement with the cone 43 to shut off the flow of feed to the pan.

The over-balanced or over-centering condition resulting from the arrangement of the holes 71 and 85 with respect to the knife-edge 61 enables a lesser weight of feed in the pan than that required to start the clockwise rotation of lever 53, to hold the parts in the dashed line positions in which the gate is closed, until substantially all of the feed is consumed by the poultry. When this stage is reached, the weight 75 will overcome the weight of the pan etc., will start counterclockwise rotation of lever, which rotation continues and becomes more positive as it increases, until the lever 53 strikes the stop 77. The gate 95' and pan 97 are thus moved upwardly relative to the hopper and cone, the gate is reopened and feed again flows into the pan. This cycle is repeated as long as there is feed in the hopper.

Should the feed become exhausted, the feeder will terminate its operation in the gate open position so that all that is necessary is to refill the hopper in order to restore the feeder to automatic operation.

As pointed out above, the adjustment of the cone with respect to the hopper, by loosening bolt 29 and adjusting nut 31, is for the purpose of providing the proper size of the annular opening 47 to facilitate the proper flow of a particular type of feed to the pan. Feeds such as mash which do not flow as readily as granular feeds require a larger opening than free flowing types of feeds.

The weight 75 can be adjusted toward or away from the hopper along the row of holes, to decrease or increase respectively the weight of feed which is discharged in each cycle of the machine.

The opening between the gate 95' and the cone 43 can be decreased and increased by raising and lowering the stop 77. Such adjustment of the stop also decreases and increases respectively, the amount of feed which will flow into the pan. When free flowing feeds are being dispensed, the gate may be adjusted so that it is closer to the cone to prevent spilling feed over the rim of the pan whereas when mash or similar feeds are used, it is advisable to raise the gate higher so that in case the feed does not flow readily, the gate is raised far enough to enable the fowls to pick at the feed in the opening 47 and start it flowing.

It will thus be seen that the amount of old feed which remains in the pan before a new supply is provided, can be closely controlled by selectively adjusting weight 75. This prevents waste of feed which occurs with other automatic feeders, wherein a new supply is released before the previous supply is consumed and this residue is continuously left in the pan where it spoils and has to be cleaned out and discarded. Feeders built in accordance with my disclosure have proved, in actual practice, that such waste and labor are eliminated.

Modified Form

FIGURE 5 discloses a mechanism for operating the gate which is disposed inside the hopper instead of outside as in FIGS. 1 to 4.

The hopper 121, gate 123, pan 125 and bail 127 are all constructed in the same fashion as described above. The pan is connected with the gate by a number of supports 129 and radial, fin-like stops 131 are fixed to the exterior of the hopper to limit lateral displacement of the gate and are the equivalent of the guides or stops 109.

An upper brace 133, similar to 13, is fastened inside and diametrically across the hopper. It is centrally perforated at 135 and a tube 137 is loosely mounted in the hole so as to depend from the brace. The upper end of the tube is threaded to receive a nut 139 by which the tube is raised or lowered with respect to the brace. A second cross brace 141 is similarly fixed adjacent the lower end of the hopper and is perforated to slidingly receive the tube. The distributing cone 143 is fixed to the lower end of the tube and extends downwardly and outwardly past the lower ends of the hopper and gate as before.

A bracket 145 is fixed to the brace 133, at one side of the tube, extends upwardly toward the center of the tube and supports, in suitable bearings, a shaft 147 for a pulley 149. The pulley has fixed to it at 151, a short length of cable 153 or the like, one end of which extends into the tube and is fastened to the upper end of a rod 155 which extends downwardly beyond the end of tube 137 and is fixed to the center portion of the pan 125. The other end of the cable passes through an opening 157 in the brace and is attached to a weight 159. A tubular housing 161 is preferably fastened to the bottom side of the brace so as to enclose the weight and a stop, in the form of a pin 163 is inserted diametrically across said housing, in the path of the weight, to limit its descent. A number of pairs of holes 165 are provided to receive the stop so that the stopping point of the weight and therefore degree of opening of the gate 123 may be varied for the purpose described above.

An eccentric weight 167 is fixed to the pulley and serves to control the gate opening and closing operation of the mechanism in the same manner as the preferred form of the device.

Operation

Starting with the parts in the positions shown in FIG. 5, in which the gate is open so that feed poured into the hopper will run into the pan, it will be seen that when the weight of the feed in the pan increases to the point that the weight of the parts supported by the portion of the cable in the tube exceeds that of the weight 159 plus the effect of the weight 167, the pan will move downwardly to close the gate. Pully 149 rotates counterclockiwse and as the eccentric weight 167 passes to the left side of the pulley center, it aids the weight of the feed, pan etc. instead of opposing it. Accordingly, as feed is consumed, the parts will not return to their initial positions until the weight 159 is able to overcome the weight of the pan etc., plus the effect of the eccentric weight 167. Further, since the effect of weight 167 decreases as it approaches the vertical line through the center of the pulley, it will be obvious that once the parts start to move from either extreme to the other, such motion will continue to completion. Thus the same over-balancing or over-centering action is attained with both of the structures disclosed herein.

While I have herein disclosed two different embodiments of my invention, I am aware that numerous changes and substitutions may be made therein without departing from the spirit of the invention. Accordingly, I do not wish to be limited to the exact structures disclosed but desire protection falling reasonably within the scope of the appended claims.

What I consider to be new and novel is:

1. A feed dispenser comprising a feed hopper, means for supporting said hopper above a floor, said hopper defining a bottom opening, a feed distributer mounted adjacent said hopper opening, extending downwardly and outwardly, beyond said hopper, and defining therewith a discharge port, a gate, means mounting said gate adjacent said port for movement toward and from engagement with said distributer to close and open said port, a pan, means for mounting said pan to receive feed flowing from said port and distributer and for movement with said gate, a first weight, means connecting said first weight to counteract a second weight comprising mainly the weight of the gate, pan, and contents of the pan, means connecting said first and second weights with said gate to move it in directions to open and close it respectively, said first and second weights being rendered effective to start to open and start to close said gate respectively when the weight of the contents is reduced and increased respectively, to and beyond the point of equilibrium of the first and second weights, and means for increasing the effect of the effective weight relative to that of the other weight, during the movement of the effective weight, to insure continuance of the movement of said gate to completion and to establish a predetermined unbalance in favor of the effective weight, thereby establishing the change in the weight of the contents required to render the other weight effective.

2. The structure defined by claim 1 which includes means for adjusting the position of the first weight to increase and reduce the amount of the unbalance in favor of the said weight.

3. The structure defined by claim 1 wherein said effect increasing means includes overcentering means which decreases the effect of the other weight as said effective weight starts to move and, upon passage over center, increases the effect of said effective weight.

4. The structure defined by claim 1 which includes means for adjusting said distributer relative to said hopper opening to change the size of said discharge port.

5. A feed dispenser comprising an upright feed hopper, means for supporting said hopper above a floor, said hopper defining a bottom opening, a feed distributer mounted adjacent said opening extending downwardly and outwardly from and beyond said hopper, and defining therewith a discharge port, a gate, means mounting said gate adjacent said port for movement toward and from engagement with said distributer to close and open said port, a pan, means for mounting said pan to receive feed flowing from said port and distributer, and for movement with said gate, a first class lever having a fulcrum, means on said hopper for supporting the fulcrum, means connecting one arm of said lever with said gate and pan, an actuating weight mounted on the other arm of said lever, so that when the weight of the feed in the pan diminishes to a predetermined point, said actuating weight will actuate said gate to open said port and thereafter when the weight of feed in the pan increases to a different predetermined point it will actuate the gate to close said port.

6. The structure defined by claim 4 wherein a line connecting the points of connection of said actuating weight and said gate connecting means with said lever lies above the fulcrum of said lever so as to alternately increase the effect of the actuating weight and the weight of feed in said pan as movement of said pan is initiated by said actuating weight and by the weight of feed in the filled pan respectively.

7. The structure defined by claim 6 which includes means for supporting said actuating weight on said lever at different distances from said fulcrum.

8. The structure defined by claim 6 which includes an adjustable stop mounted on said hopper in the path of the arm bearing said actuating weight to vary the opening movement of said gate and the amount of feed which is deposited in the pan.

9. The structure defined by claim 6 wherein the means connecting said one arm of said lever with said gate and pan includes a flexible portion.

10. The structure defined by claim 6 wherein said hopper is substantially cylindrical in cross-section, said gate is cylindrical and has a diameter greater than that of the hopper and said distributer is a cone having its apex directed upwardly and is substantially concentric with said hopper.

11. The structure defined by claim 10 which includes means for maintaining said gate substantially concentric with said hopper.

12. The structure defined by claim 6 which includes means for supporting said gate and pan in vertically spaced relation to each other with said gate disposed above and said pan disposed below said distributer.

13. The structure defined by claim 6 wherein the means for supporting the hopper includes a bail mounted on the hopper adjacent the upper end thereof, said bail lying substantially in a plane which includes the axis of the hopper and of the actuating weight, said bail having its highest point disposed at the side of the axis of the hopper nearest the actuating weight so that the hopper will hang substantially vertical.

14. The structure defined by claim 6 which includes means on said other arm of said lever for preventing a fowl from roosting thereon.

15. A feed dispenser comprising an upright feed hopper, means for supporting said hopper above a floor, said hopper defining a bottom opening, a feed distributer mounted adjacent said opening, extending downwardly and outwardly from and beyond said hopper, and defining therewith a discharge port, a gate, a pan, means for connecting said gate and pan together, in spaced relation, with said gate above and the pan below said distributer, said gate being movable up and down relative to said distributer to open and close said port, a tube mounted on and interiorly of said hopper and passing through said distributer, a pulley mounted on said hopper adjacent the upper end thereof for rotation about a horizontal axis, means, including a flexible member, connected at one end with said pan, extending upwardly through said tube, said flexible member extending over said pulley and having its free end attached to a primary weight, an additional weight mounted for movement with said pulley from one side of the axis thereof over said axis to the other side thereof, toward and away from said primary weight, as said primary weight falls and rises respectively, so as to cause said gate to dwell in both its port open and port closed positions.

16. The structure defined by claim 15 which includes means for variably limiting the amount of gate opening movement.

17. The structure defined by claim 16 wherein said limiting means includes an adjustable stop disposed for engagement with the bottom of said primary weight.

18. The structure defined by claim 16 which includes a shroud mounted on said hopper and surrounding said primary weight.

References Cited in the file of this patent
UNITED STATES PATENTS

| | | |
|---|---|---|
| 772,121 | Anderson | Oct. 11, 1904 |
| 1,815,679 | Ruth | July 21, 1931 |